United States Patent [19]
Hook

[11] 3,895,745
[45] July 22, 1975

[54] ROTARY VALVE HAVING AN IMPROVED AIR SEAL

[75] Inventor: Cecil Hugh Ridler Hook, Asbestos, Canada

[73] Assignee: Johns-Manville Corporation, Denver, Colo.

[22] Filed: Feb. 25, 1974

[21] Appl. No.: 445,181

[52] U.S. Cl. ............................... 222/368; 222/368
[51] Int. Cl. ........................................... G01f 11/10
[58] Field of Search .......... 251/304, 314, 316, 317, 251/180, 174, 176, 205, 157; 277/95, 81, 83, 85, 96, 94; 55/142, 432, 433, 428, 303, 282; 137/343, 625.15, 375, 625.11, 376, 625.18, 384, 385, 383, 454.4, 454.6, 560; 222/194, 368

[56] References Cited
UNITED STATES PATENTS

| | | | |
|---|---|---|---|
| 1,024,785 | 4/1912 | Johnson, Jr. | 251/192 X |
| 2,158,832 | 5/1939 | Podbielniak | 277/87 |
| 2,428,241 | 9/1947 | Pootjes | 222/368 |
| 2,907,499 | 10/1959 | Agronin | 222/368 X |
| 3,151,784 | 10/1964 | Tailor | 222/194 X |
| 3,556,355 | 1/1971 | Ruiz | 222/368 |
| 3,708,890 | 1/1973 | Weisselberg | 222/368 X |
| 3,750,902 | 8/1973 | Starrett | 222/194 X |

FOREIGN PATENTS OR APPLICATIONS

| | | | |
|---|---|---|---|
| 451,562 | 8/1936 | United Kingdom | 222/368 |
| 686,121 | 5/1964 | Canada | 222/368 |
| 1,177,100 | 3/1957 | France | 222/194 |

*Primary Examiner*—Martin P. Schwadron
*Assistant Examiner*—Robert J. Miller
*Attorney, Agent, or Firm*—Robert M. Krone; John H. Miller

[57] ABSTRACT

A rotary valve for discharging dust or other material has a pressurized annular seal at each end of the rotating vane in addition to other conventional seals that permits the valve to be used in high vacuum systems.

12 Claims, 11 Drawing Figures

PATENTED JUL 22 1975 3,895,745

SHEET 1

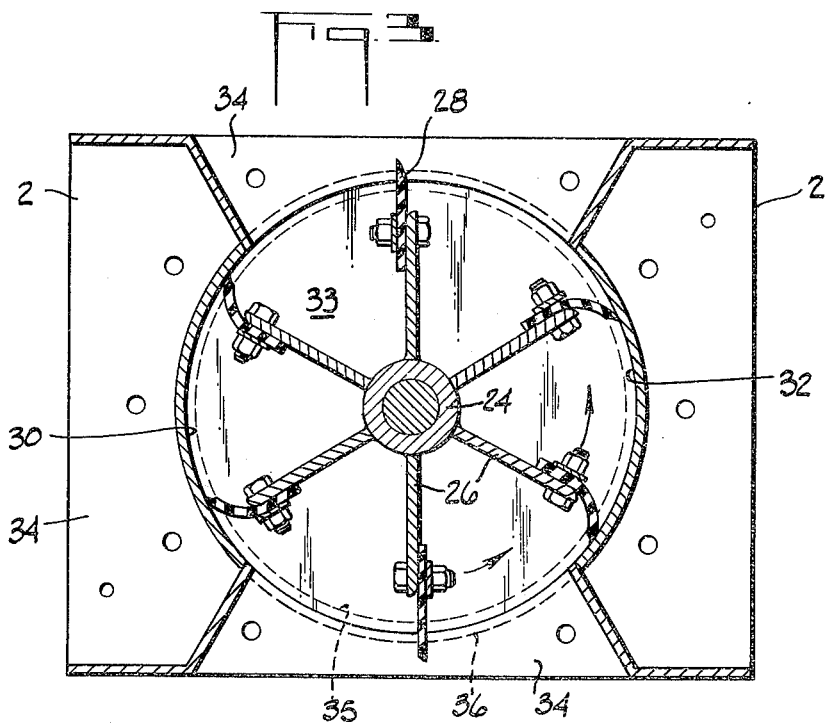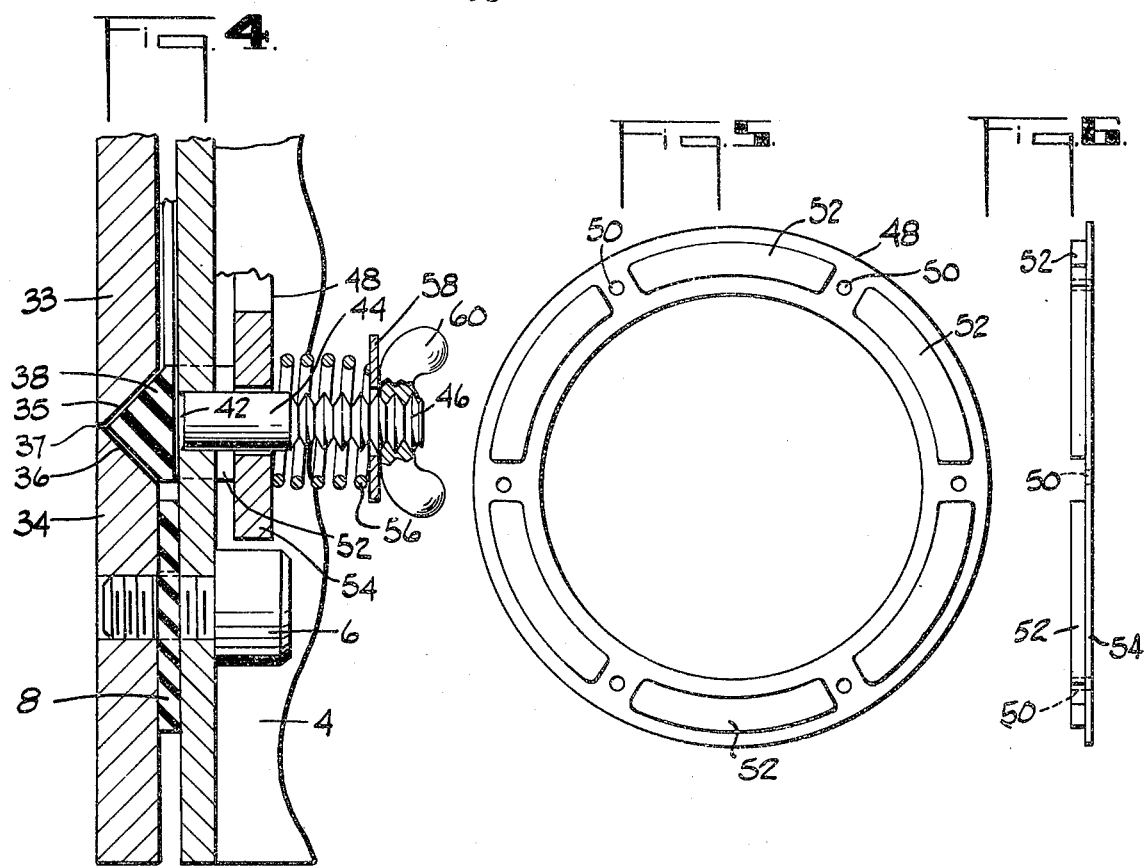

  
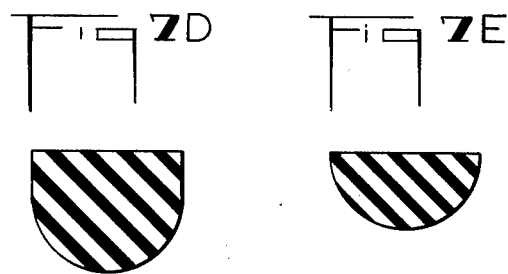

ROTARY VALVE HAVING AN IMPROVED AIR SEAL

This invention relates to air tight rotary valves and particularly to air tight rotary valves for use in high vacuum systems.

BACKGROUND OF THE INVENTION

Rotary valves are used in dust collection systems, central vacuum cleaning systems and in transfer systems that use air movement to transfer particulate material from one point in the system to another. These systems utilize an internal air pressure that is substantially below atmospheric pressure. The function of the rotary valve is to continuously or periodically discharge dust or particulate material from within the system to the exterior while preventing outside air from entering the system through the valve. If the rotary valve leaks outside air into the system it raises the internal air pressure significantly lowering the performance of the system.

Prior art rotary valves have primarily depended upon a close fit of the metal parts to maintain a seal, however, these valves have encountered serious problems. These valves require an undesirably large amount of power to operate because of their tendency to be locked up by the invasion of dust and fine particles between the metal parts. In many systems the dust and fine particles are abrasive, even to hardened steel, and thus soon erode the valve parts destroying the original close fit. Once this happens the seal is lost.

BRIEF SUMMARY OF THE INVENTION

Applicant has invented an improved rotary valve having a pressurized and long wearing replaceable gasket type annular seal that overcomes the problems presented by the use of prior art rotary valves in high vacuum systems.

BRIEF DESCRIPTION OF THE DRAWINGS

FIG. 3 is a cross-section of the body section of the valve illustrated in FIG. 2, the rotating vaned section including a side plate and the axle.

FIG. 4 is an enlarged partial cross-section taken along lines 4—4 in FIG. 2 and shows the pressurized gasket sealing arrangement.

FIG. 5 is a plan view of one of the two identical pressure plates used in the valve shown in FIG. 2.

FIG. 6 is an edge view of the pressure plate shown in FIG. 5.

FIGS. 7A–7E show several suitable sealing gasket cross-sectional configurations.

DETAILED DESCRIPTION AND PREFERRED EMBODIMENTS

Figure 1:
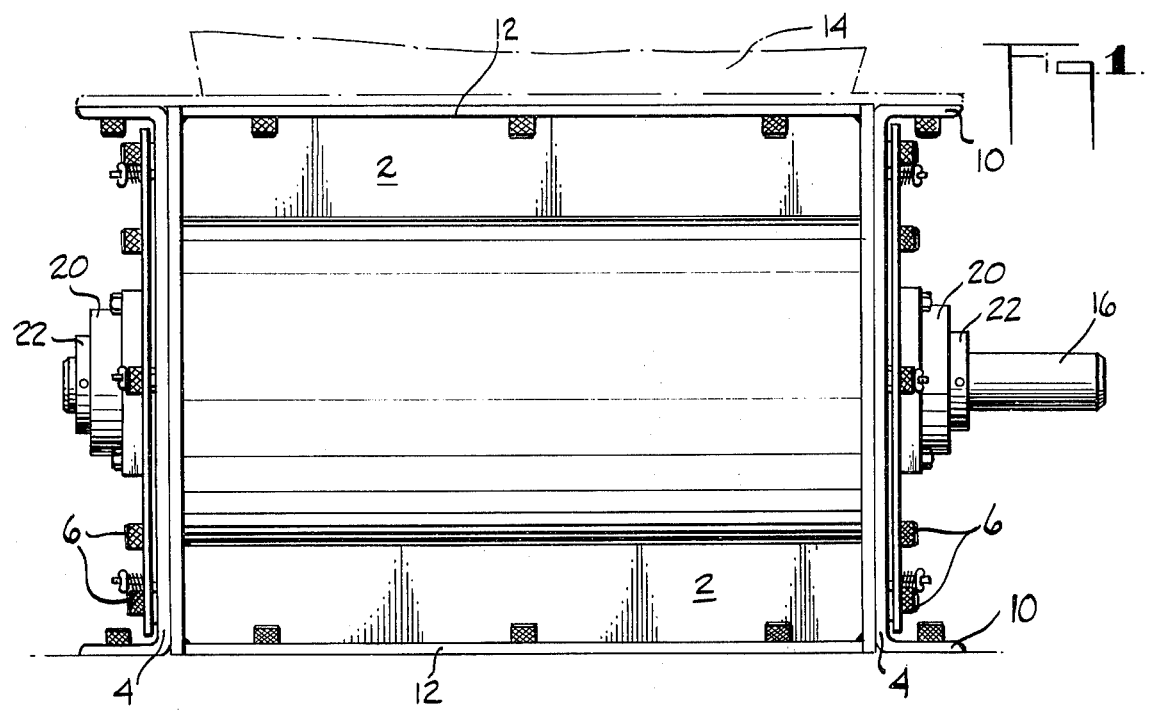
FIG. 1 is a frontal view of the exterior of a rotary valve of the present invention less a conventional drive mechanism.

The rotary valve shown in FIG. 1 is comprised of a body section 2 that spans between two flanges end plates 4. The flanged end plates 4 are bolted to the body section 2 by a plurality of bolts 6, preferably with a thin conventional annular gasket material 8 therebetween as shown in FIG. 4. Flanges 10 and 12 on end plates 4 and body section 2 respectively permit the rotary valve to be fastened onto a chute or hopper 14, a bagger, or any other desired device.

Running horizontally and substantially through the center of the body section of the valve is a shaft 16, preferably containing a keyway (not shown) running either the entire length of shaft 16 or occurring intermittently and at functional locations along the length of the shaft. The shaft rotates in conventional bearings 20 mounted on the exterior of each end plate 4. The shaft 16 can be fixed from straying horizontally by keepers 22. The shaft 16 can be made to rotate by placing a pulley, gear, sprocket, etc., on the extended end of the shaft and by connecting a conventional motor (not shown) through a conventional drive train (also not shown) to said pulley, sprocket, etc.

Connected to the shaft 16 on the interior of said body section 2 is a hub 24 having a plurality of radially extending vanes 26 as shown in FIG. 3. Along terminal edges of many, and preferably all, of the vanes 26 are fastened wipers 28. Wipers 28 are made of a flexible material, such as rubber, and must be sufficiently long and sufficiently elastic to provide a good seal while they are in contact with the curved interior horizontal surfaces 30 and 32 of body section 2.

As indicated by the arrows in the embodiment shown in FIG. 3, the vanes 26 and wipers 28 are rotated in a counterclockwise direction. Since under normal operation the air pressure at the bottom of the valve is greater than the air pressure at the top of the valve air attempts to move in a generally upward direction between wipers 28 and surfaces 30 and 32. This attempted air movement would, because of the counterclockwise rotation of shaft 16, tend to force wipers 28 into a tighter contact with surface 32, but would also tend to force wipers 28 out of contact with surface 30 thereby causing air leakage along this surface. This problem can be alleviated by mounting the shaft 16 slightly off center along the horizontal axis toward surface 30. This causes wipers 28 to be bent more by their contact with surface 30 than by their contact with surface 32. If it is desired to rotate shaft 16 clockwise then the shaft should be mounted off center towards surface 32. In any event, wipers 28 should be made from a material that is sufficiently elastic to provide a good seal against surfaces 30 and 32 even if shaft 16 is mounted dead center. A suitable material for use in making wipers 28 is a rubber having a durometer hardness of 40 and having a reinforcing base of fabric on one side, such as a material trademarked ARMORLITE available from the B. F. Goodrich Company.

Side plates 33, preferably fastened to hub 24 and vanes 26 as shown in FIG. 3, lie flush with the ends of the hub 24 and vanes 26 to form a rotor. As indicated by the dotted lines in FIG. 3 and more clearly by FIG. 4, the outer periphery of the side plates 33 are beveled, preferably at a 45° angle, through at least a portion of the thickness of the plate to form beveled surfaces 35. The bevel is such that the diameter of the faces of the side plates 33 in contact with vanes 26 is greater than the diameter of the opposite faces. Similarly, the interior annular edges of body flange plates 34 positioned on the ends of the body section 2, are also beveled preferably at a 45° angle to form beveled surfaces 36. Beveled surfaces 36 generally face away from the interior of the said body section.

Side plates 33 extend out to almost meet the interior annular edges of the body flange plates 34 leaving a small clearance 37. This small clearance 37 is helpful to allow the rotor to turn while body flange plates 34 and surfaces 30 and 32 remain stationary.

Beveled surfaces 35 and 36 define a V-shaped slot at each end portion of the valve, each slot opening towards an end of the valve. Into each V-shaped slot is placed a wear resistant gasket 38 having a cross-sectional configuration similar to the slot, but preferably having a thickness greater than the depth of the slot. The wear resistant gasket can be in the form of a continuous loop having a diameter essentially equal to the diameter of the slot or it can be comprised of a discontinuous piece or pieces having a total effective length essentially equal to the circumference of the slot. The wear resistant gasket 38 can be made from any conventional wear resistant material such as elastomers such as natural or synthetic rubber, a nylon, a polytetrafluoroethylene, etc., resin-cloth laminates, elastomer-cloth laminates, etc. It is preferred that wear resistant gasket 38 have sufficient elasticity that the need for a very precise fit is unnecessary. A preferred material for gasket 38 is a natural or synthetic rubber having a durometer hardness of about 80.

Figure 2:
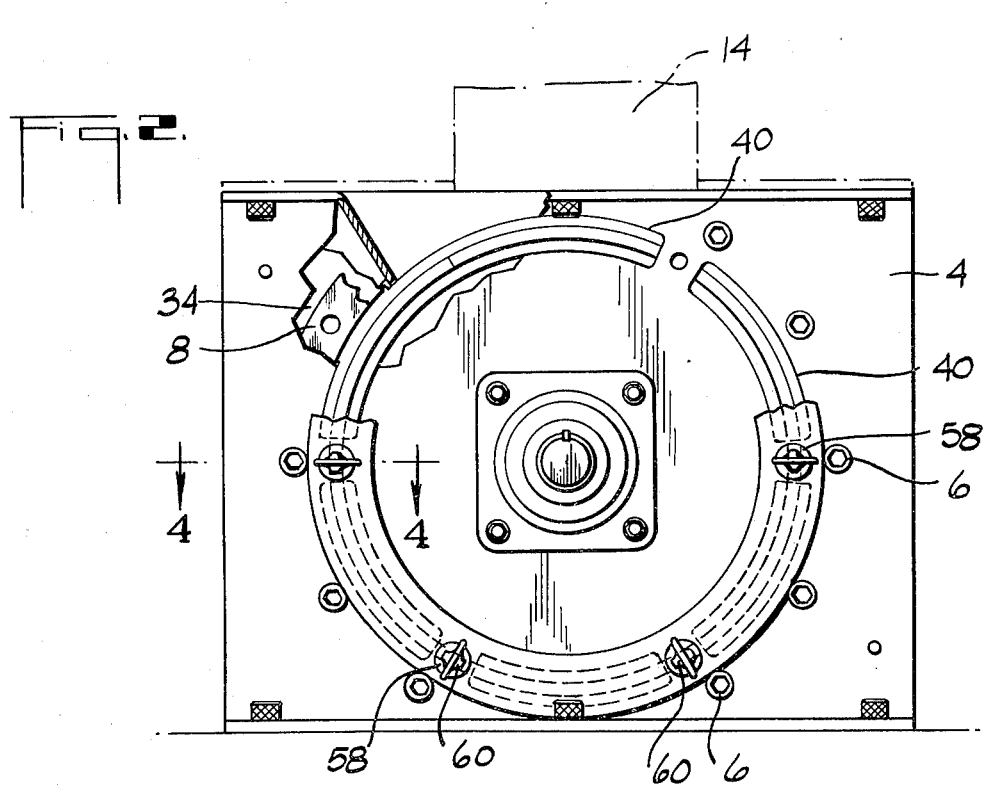
FIG. 2 is an end view of a preferred embodiment of the valve shown in FIG. 1 partially cut away to show the pressurized gasket sealing arrangement.

To insure that wear resistant gasket 38 will maintain a good seal against beveled surface 35 as wear occurs along the innerface wear resistant seal 38 is constantly pressed into the slot and thus against surface 35 by a variable amount of pressure maintained by a mechanism illustrated in FIGS. 2, 4, 5 and 6. As shown in FIG. 2, end plates 4 contain a plurality of curved openings 40 whose centerline generally coincides with the centerline of each V-shaped slot. In each area of the end plates between the curved openings and centered on the center line of said curved openings there exists at least one hole 42. A bolt 44 having threads 46 on at least one end is secured in each hole 42 by any conventional means, such as by threads, a weld, etc.

FIGS. 5 and 6 illustrate one of two indentical pressure plates 48 used in the valve. Pressure plate 48 is comprised of plates 54 having holes 50 and raised portions 52. The centerline of the holes 50 and the raised portions 52 is made to coincide with the centerline of the V-shaped slot. The holes 50 are slightly larger in diameter than the bolts 44 and are located to coincide with bolts 44 when pressure plate 48 is mounted on end plate 4. The raised portions 52 on end plate 48 are sized and located such that when a pressure plate 48 is mounted on an end plate 4 the raised portions 52 extend through the openings 40 in the end plate 4 to bear against the top surface of the wear resistant gasket 38 as illustrated in FIG. 4. The thickness of raised portions 52 should be significantly greater than the thickness of end plate 4 to permit wear and thus decrease in the thickness of gasket 38.

To maintain a desired amount of pressure on pressure plate 48 and thus on gasket 38 to hold the latter in sealing contact with beveled surfaces 35 and 36 a coil spring 56 is placed around each bolt 44 with one end of the spring in contact with plate 54 of pressure plate 48. A washer 58 is also placed around each bolt 44 to contact the other end of spring 56. A nut 60, preferably a wing nut, is then threaded onto each bolt 44 and tightened down to compress spring 46 until the desired amount of pressure is exerted by the compressed springs 56 on pressure plate 48. As wear occurs at the innerface of gasket 38 and beveled surface 35 the compressed springs 56 keep gasket 38 in sealing contact with beveled surface 35. Nuts 60 can be further tightened periodically if necessary.

Although the preferred embodiment has been described as utilizing a slot and gasket having a V-shaped configuration, other configurations would be operable, such as those shown in FIGS. 7C–7E.

Although springs are used to pressurize the gasket in the preferred embodiment any conventional method of pressurizing would be suitable, such as the use of air or hydraulic pressure in conjunction with cylinders, flexible membranes, etc.

What I claim is:

1. A rotary valve comprising end plates, a body section, a rotatable shaft running lengthwise through said body section and extending through said end plates, a plurality of vanes extending outward from said shaft, said vanes having wipers along their terminal edges to maintain seals between said vanes and said body section, side plates surrounding said shaft and lying parallel to said end plates, said side plates adapted to rotate with said shaft, and an annular gasket forming a sealing relationship between each side plate and the body section the improvement comprising said annular seal at each side plate being formed by a wear resistant gasket pressed against at least one annular beveled sealing surface on each of said side plates and against a sealing surface on the body section opposite said beveled surface by adjustable pressurizing means.

2. The valve of claim 1 wherein said at least one beveled surface is located on the outer periphery of each of said side plates and faces away from the interior of said valve.

3. The valve of claim 2 wherein the cross-sectional configuration of said gasket is V-shaped and said gasket resides in a V-shaped slot defined by said beveled surface and a second annular beveled surface located on each end of said body section adjacent to the first beveled surface.

4. The valve of claim 3 wherein said gasket is pressed against said V-shaped slot by variable pressure generating means.

5. The valve of claim 2 wherein the cross-sectional configuration of said wear resistant gasket is that shown in FIG. 7C.

6. The valve of claim 2 wherein the cross-sectional configuration of said wear resistant gasket is that shown in FIG. 7D.

7. The valve of claim 2 wherein the cross-sectional configuration of said wear resistant gasket is that shown in FIG. 7E.

8. The valve of claim 4 wherein said gasket is made from a wear resistant elastic material.

9. The valve of claim 8 wherein said elastic material is a natural or synthetic rubber having a durometer hardness of about 80.

10. The valve of claim 4 wherein said gasket is made from a material selected from the group consisting of rubber, a synthetic polymer resin-cloth laminate, and rubber-cloth laminates.

11. The valve of claim 1 wherein said gasket is pressed against at least one annular beveled surface in the outer surface of said side plate, said beveled surface located intermediate the outer surface of said shaft and the terminal periphery of said side plate.

12. The valve of claim 1 wherein said wear resistant gasket is pressed against at least one beveled surface by one or more springs.

* * * * *